Nov. 20, 1934.    J. D. PATTON    1,981,752
WINDOW
Filed Feb. 14, 1933    2 Sheets-Sheet 1
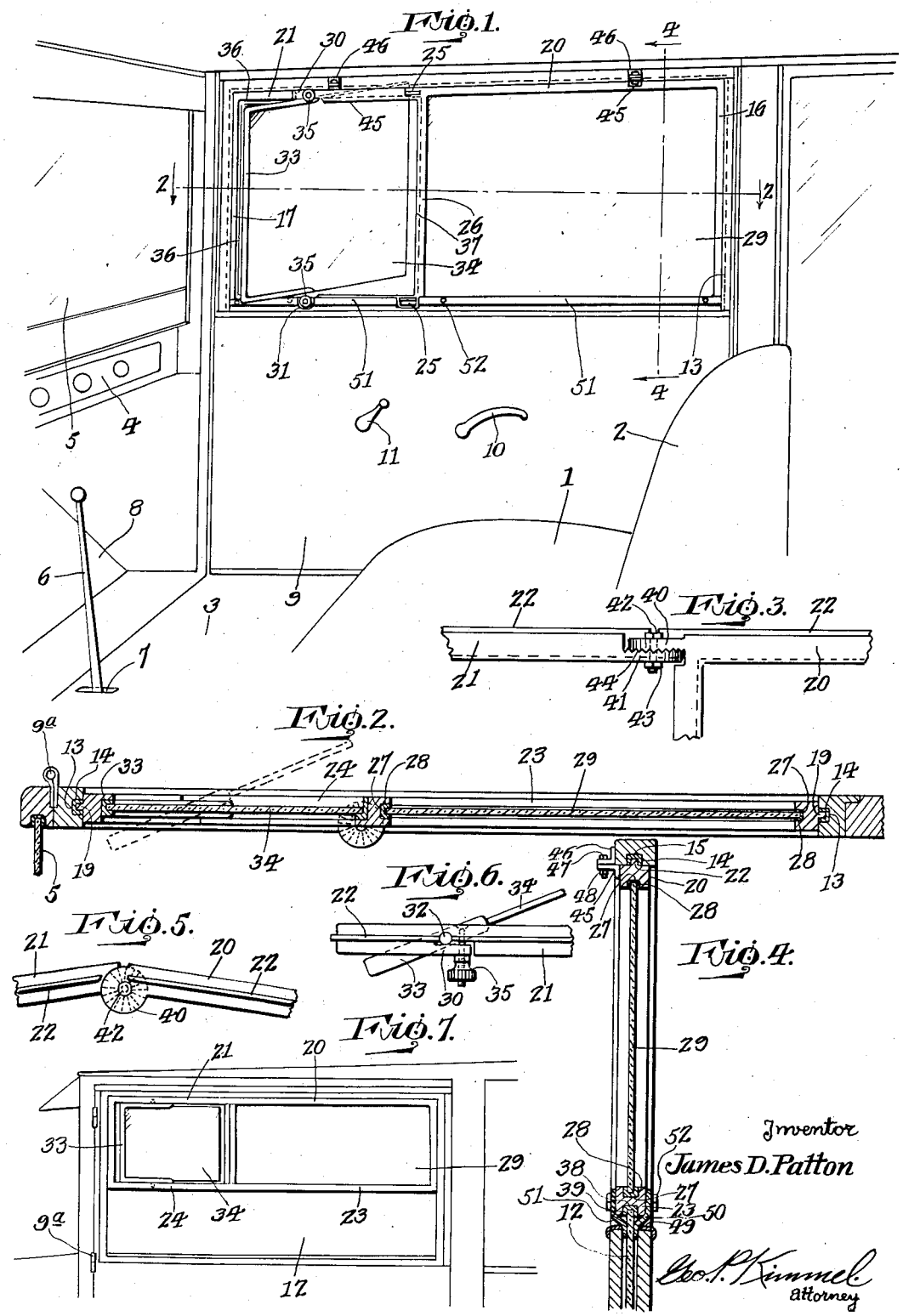
Inventor
James D. Patton
Geo. P. Kimmel
Attorney Nov. 20, 1934.  J. D. PATTON  1,981,752
WINDOW
Filed Feb. 14, 1933  2 Sheets-Sheet 2
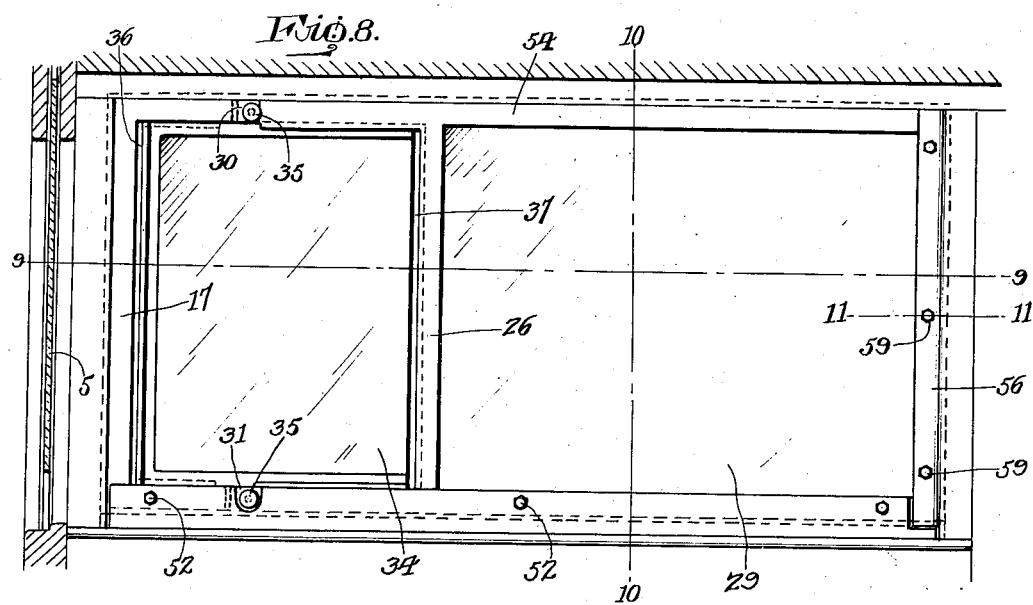
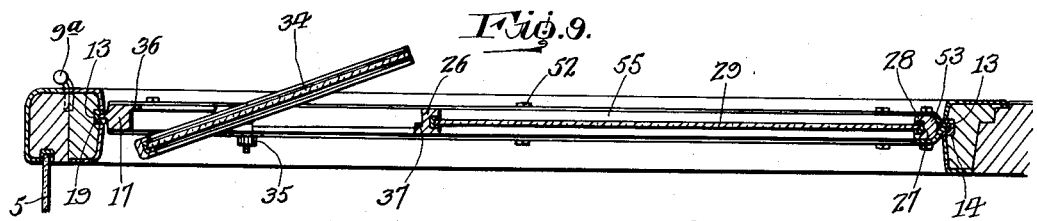
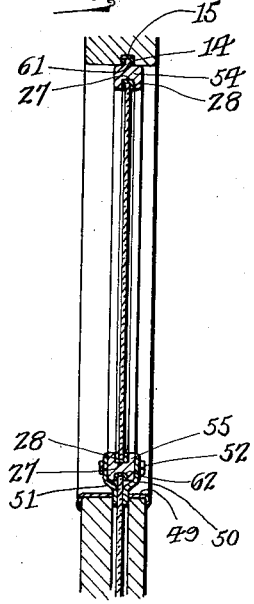
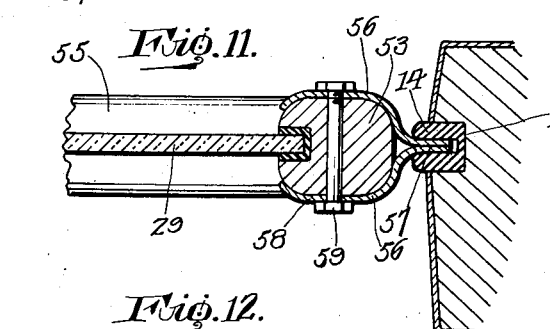
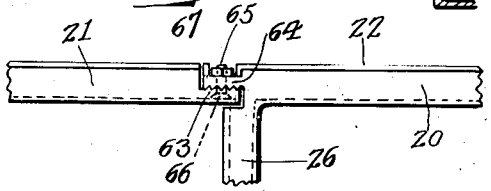
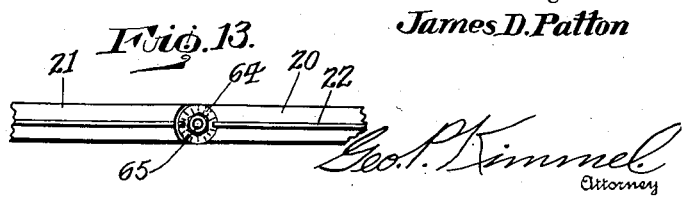
Inventor
James D. Patton
Geo. P. Kimmel
Attorney Patented Nov. 20, 1934

1,981,752

UNITED STATES PATENT OFFICE 1,981,752

WINDOW

James D. Patton, Windber, Pa.

Application February 14, 1933, Serial No. 656,709

5 Claims. (Cl. 296—44)

This invention relates in general to windows and more particularly has reference to a window adapted to provide draftless ventilation for a moving vehicle.

In the past, vehicles and particularly motor vehicles have been provided with window openings in their doors and side walls and with a single pane of glass slidable up or down to close or open each of such openings. The framework around these openings is usually provided with a series of grooves lined with felt or other cushioning material and adapted to receive the edge portions of the plate of glass. At one side of these openings, usually at the bottom, the side wall or door construction of the vehicle has been provided with an opening for the purpose of receiving the piece of glass when it is lowered to open the window.

It has been found with the type of window above referred to that when one person in a vehicle desires more ventilation and opens a window adjacent him for that purpose a draft is usually created through other portions of the vehicle, resulting in extreme discomfort if not serious impairment of the health of the other occupants of the vehicle. Also, drivers of such vehicles have been put to considerable inconvenience and trouble in order to give the customary hand signals to other drivers to indicate what course he wishes to pursue. It was necessary with such structure for the driver to lower the window next to him almost all the way to the bottom of the opening before he was enabled to put his hand and arm out so as to give proper signals. Besides the time required to carry out this performance and the danger and inconvenience involved by a driver attempting to lower a window in this manner while encountering heavy traffic, the remainder of the vehicle is at the same time exposed to drafts and cold as well as to any storm condition which might prevail at the time.

For the purpose of preventing drafts in motor vehicle construction there has recently been developed an arrangement whereby ventilation of the vehicle might be secured without the danger of drafts being involved. This construction in general has consisted of limiting the slidable piece of glass used in opening and closing the windows to such a size that it would cover only the rear portion of the window without affecting the forward part of the window opening. This forward part of the window opening has been closed in this construction by means of a supplemental piece of glass usually mounted in a frame and hinged to the forward side of the window frame. It is thus allowed to swing about its vertical pivot at its forward edge so that its rear edge will project outwardly from the side of the vehicle and cause the ventilation of the vehicle by extracting air from the window instead of by allowing air to enter through the window.

However, in the above mentioned arrangement there has been no means provided whereby the driver of the vehicle might extend his hand and arm for the purpose of making signals without lowering the slidable portion of the window from the top and thus allowing the same disadvantages which prevailed in the previous construction. Furthermore, it will be appreciated that this recently developed construction is limited to vehicles having their bodies formed in a certain manner for employing this type of window. This type of window is not adaptable in its previously used forms to vehicles constructed for use with the old type of windows without extensive alterations of such vehicle, and is hence limited in its application so as not to be usable in connection with previously constructed vehicles, or vehicles not constructed for the purpose of employing this type of ventilation.

One of the objects of this invention is therefore to provide a device for providing a draftless ventilation for vehicles not especially constructed with that end in view.

Another object of this invention is to provide a draftless ventilation for any car or other moving vehicle without alteration of the previous construction of the vehicle.

Another object of this invention is to provide a construction of the type set forth which may be easily and quickly attached to or detached from the vehicle without material alteration of the same. It is an object of this invention that this device shall protect the interior of the vehicle from rain, snow and other storm conditions prevailing.

Furthermore, it is an object of this invention to provide a device of the type set forth which will allow the hand or arm to be extended from the window of the vehicle for signalling purposes and the like without opening the vehicle window by an undue amount or without interfering with the non-draft ventilation features of the device.

Other objects and advantages of this invention will become apparent from the following description taken in connection with the accompanying drawings, it being understood that the same are by way of illustration and example only and are not to be taken as in any way limiting the scope or spirit of this invention. The spirit and scope of this invention are to be limited only by the prior art taken in connection with the accompanying claims.

Referring now more particularly to the drawings in which like numerals indicate corresponding parts throughout:

Figure 1 is a view of an interior of a vehicle illustrating the device of this invention in place in one of the window openings thereof.

Figure 2 is a section taken along the line 2—2 of Figure 1.

Figure 3 is a detail view illustrating the hinge construction embodied in this device.

Figure 4 is a vertical section taken along the line 4—4 of Figure 1.

Figure 5 is a plan view of the device illustrated in Figure 3.

Figure 6 is a detail view of the pivot construction for the movable portion of the window of this device.

Figure 7 is a view of the outside of a vehicle illustrating a modification.

Figure 8 is a view similar to Figure 1 but illustrating another embodiment of this invention.

Figure 9 is a section taken along the line 9—9 of Figure 8.

Figure 10 is a section taken along the line 10—10 of Figure 8.

Figure 11 is an enlarged section taken along the line 11—11 of Figure 8.

Figure 12 is a view similar to Figure 3 illustrating an improved form of hinge joint.

Figure 13 is a view similar to Figure 5 illustrating the hinge joint shown in Figure 12.

Referring now more particularly to Figure 1, there is shown the interior of a motor vehicle having the usual type of seat 1 having a back 2, the usual type of floor 3, instrument board 4 and windshield 5. The lever 6 and other necessary controls for operating the vehicle are projected in the usual manner through openings like the openings 7. It is noted that the floor 3 at its forward portion slopes upward as at 8. Figure 1 also illustrates a side door 9 provided with a handle 10 for operating a latch and opening and shutting the same, and with a handle 11 for raising and lowering the window glass 12 within the slide ways 13. Grooves 13 as well as the similar groove 15 in the top of the window opening are provided with felt linings 14 which normally are adapted to receive the side and top edges of the customarily used slidable glass 12. The door 9 is hinged to the body of the vehicle in the customary manner by the hinges 9a.

In accordance with this invention, there is provided a frame of substantially the same length and height as the window, the end members 16 and 17 of this frame each having a flange or tongue 19 adapted to fit into the felt lined grooves 13. The top members 20 and 21 of this frame are likewise provided with flanges or tongues 22 adapted to fit into the felt lined groove 15 in the main part of the regular window frame.

It will be noted that the two top frame members 20 and 21 and the two bottom frame members 23 and 24 are hinged together by means of hinges 25 so as to make the frame semi-collapsible. Extending between the hinged ends of the frame members 20 and 23 is a center mullion 26, whereby it will be seen that a substantially rigid four-sided frame will be formed by the frame members 16, 20, 23 and 26. As illustrated in Figures 2 and 4 respectively, these frame members are each provided with a groove 27 lined with felt or some other cushioning material 28. This portion of the frame is then provided with a single piece of glass 29 which is rigidly held in place therein.

As is clearly shown in the drawings in Figures 1 and 6, the frame members 21 and 24 are provided with correspondingly positioned bearings 30 and 31 adapted to receive the pintles 32 carried by the top and bottom sides of the pivoted frame 33. Mounted in this pivoted frame 33 is a second piece of glass 34 of such size as to exactly close the opening between the top and bottom frame members 21 and 24 and between the end frame members 17 and the center mullion 26. Being mounted in the pivoted frame 33, this second piece of glass 34 is adapted to swing about the axis of the pintles 32 to open or close the opening just mentioned, and to provide draftless ventilation through the opening. The pintle bearings are preferably in the form of split bearings each having a knurled nut 35 by which the pintles 32 may be clamped in fixed position. This will allow the glass 34 to be clamped in any adjusted position desired. By its very nature, this clamping means will prevent any rattling or undesirable vibration of the glass 34.

For the purpose of providing a weatherproof connection between the pivoted glass 34 with its frame 33, and the frame members 17, 21, 24 and 26, the frame members 21, 24 and 17 are provided on the forward side of the bearings 30 and 31 with an inwardly extending flange 36, and to the rear of the bearings 30 and 31, the frame members 21 and 24 and center mullion 26 are provided with an inwardly extending flange 37. The plane of the flange 36 lies outside of the axis of the bearings 30 and 31, while the plane of the flange 37 lies to the inner side of this axis, whereby it will be seen that when the glass 34 is moved to its closed position, its forward edge which is mounted in the pivoted frame 33 will come in contact along its outer edge with the flange 36, and the rear portion of this glass will come in contact along its inner edge with the flange 37. Thus, when the vehicle is moving in a forward direction, it will be seen that rain and other outside elements will be absolutely prevented from entering through the joints between the various members.

It will be appreciated that although the frame 33 has been illustrated as extending only part way around the pivoted glass 34, it may be either made of greater or smaller extent than shown without departing from the spirit or scope of this invention.

With reference to Figure 4, it will be seen that the lower frame member 23 is provided on its lower edge with a groove 38 similar to the groove 27 in its upper edge. This groove 38, like the groove 27 is provided with a felt lining 39. The frame member 24 is provided with a similar groove in its lower edge so positioned to be normally in alignment with the groove 38 in the member 23. As is illustrated in Figure 1, when the frame as just described is mounted in position in the regular window frame, the ribs or tongues 19 and 22 of the frame engaged with the grooves 13 and 15 of the regular window frame, the regular window glass 12 may then be raised by means of the handle 11 until it comes in contact and enters the slot 38 in the under side of the frame members 23 and 24. When in this position, it will be seen that a weatherproof joint has been formed all around the auxiliary frame and that the window opening is closed as effectively as it would be were the regular window 12 raised to its full elevated position without the auxiliary frame and auxiliary window being present. Furthermore, it will be observed that by loosening the knurled nut 35 the rearward edge of the glass 34 may be swung outwardly, thereby causing the forward edge of the glass to swing slightly inwardly, and the outer air rushing past this window when in such position will cause the air to be drawn off from the interior of the vehicle through this window thus producing a draftless ventilation. In this connection, it has been found desirable that the axis of the bearings 30 and 31 be about one-third of the length of the glass 34 back from its forward edge. However, this position may of course be varied as found most desirable. Also, I have shown the glass 34 as occupying about one-third of the entire length of the auxiliary frame, but it may be made either larger or smaller than shown as found most desirable.

It has been previously mentioned that the frame members 20 and 21 and the frame members 23 and 24 respectively are hinged together by means of hinges 25. These two hinges 25 are preferably of the form illustrated in Figures 3 and 5, consisting each of a pair of discs 40 and 41 made integral respectively with the members which are to be joined together. These discs are provided with perforations at their centers for the purpose of receiving a bolt 42 having a nut 43 threaded thereon. The discs 40 and 41 are each provided with radial serrations or grooves 44 on their contacting faces. It will thus be seen that when the nut 43 is tightened up on the bolt 42 so as to draw the serrations 44 on the respective faces of the discs 40 and 41 tightly in contact with each other, the two members will be rigidly locked together and the hinge will be inoperative. In order to make use of the hinge, it is then necessary to loosen the nut 43 so that the serrations on the faces of the respective discs 40 and 41 may move apart and rotate with respect to each other.

In placing the auxiliary frame within the window opening of the vehicle the nuts 43 are first loosened so that the hinges 25 may be allowed to operate, and the frame is then bent along the hinge line of the hinge 25 so as to place the frame members 21 and 24 in angular position with respect to the frame members 20 and 23. When in this position, the frame may be inserted between the two slide ways 13 ordinarily adapted to serve as guides and retaining means for the window glass 12. This frame is thus inserted with the window glass 12 in its lowered position, and is straightened out so that the members 20 and 21 and the members 23 and 24 will be in alignment with each other. The nuts 43 and the hinges 25 are then tightened so as to lock these hinges and prevent deflecting of the frame. After the auxiliary frame has been inserted in the regular window frame as just described with the flanges or tongues 19 in engagement with the grooves 13, and after the nut 43 has been tightened up with the frame members in aligned position, the entire auxiliary frame can then be pushed upwardly until the tongue 22 engages in the groove 15. The window glass 12 may then be raised by means of the handle 11 until it comes in contact with the lower side of the frame members 23 and 24, and engages with the grooves 38 in the same.

In order to maintain the auxiliary window frame in its proper position even though the window glass may be lowered, there are provided a pair of lugs 45 on the upper frame members 20 and 21 respectively, and a pair of complementary lugs 46 which may be secured to the regular door frame, these lugs being so positioned and perforated as to receive bolts 47 therethrough. The bolts 47 are then provided with a pair of wing nuts 48, and it will be seen that the auxiliary frame is thereby firmly secured in its upper position. In the form shown in Figures 1 and 4 however, the auxiliary frame is substantially the same height as the window opening, the members 23 and 24 only clearing the window sill 49 by an amount sufficient to allow the tongue 22 to be disengaged from the groove 15.

In Figure 7 there is shown a slight modification in which the auxiliary frame is of substantially identical construction with the one above described, except that it is so constructed as to leave several inches between the bottom of the auxiliary frame and the bottom of the regular window frame opening, this space normally to be closed by the customary window. This modified form is adapted to be placed next to the driver's seat and is for the purpose of enabling the driver when he desires to signal the traffic in the customary manner, to lower the regular window away from the auxiliary window frame, and to thus provide room for putting out his hand or arm in making the signal. By this means, it will be seen that the driver is enabled to signal to traffic without having to open the entire window or a major part of the same as is necessary when some such arrangement as the one at present described is not used. It will be perceived that this enables the opening to be provided for the driver to put out his hand at such time as would otherwise be required, thus not only allowing him to make his signal quicker but at the same time allowing him to pay closer attention to the traffic about him.

In some cars the top of the regular opening is curved instead of straight as illustrated, the top of the customarily used window glass being curved in like manner to fit the top of the window. In such an instance it is contemplated that the upper part of the frame shall be made to conform to the shape of the top of the opening. For the purpose of insuring a weatherproof contact with the curved top of the regular window glass there are provided a pair of skirt members 50 and 51 having parts adapted to extend downwardly along the outside and inside surfaces respectively of the regular window glass 12 below the window sills 49. In applying the skirt members 50 and 51, the auxiliary frame is first inserted in position as previously described, the skirt members are then slid down along the inner and outer surfaces of the glass 12 and their upper part are secured to the members 23 and 24 of the auxiliary frame by some suitable means such as the bolts 52. The skirt member 51 is cut away where necessary at its upper edge to fit around the hinge 25 and the knob 35.

Referring now to the structure illustrated in Figures 8 to 11 inclusive, it will be seen that this is similar to the structure previously described except for the means for inserting and securing it in place in the window opening. In this form the hinge joints 25 have been omitted, the end member 17 and the center mullion 26 being the same as in the previous case, but the end member 53 and the top and bottom frame members 54 and 55 being somewhat modified. As above mentioned, the hinge joints 25 are omitted and hence the top and bottom frame members 54 and 55 extend the entire length of the frame. They are made of such a length that when the bead 19 on the end member 17 is inserted in its groove 13, the end member 53, which has no bead, may be brought into line with the other groove 13 with a slight clearance. For the purpose of securing the frame in this position there are now provided a pair of metal tongue members 56 each having a part 57 adapted to engage the felt lined groove 13 throughout its length and a part 58 adapted to be secured to the frame member 53 by suitable means such as the bolts 59. It will be seen that the tightening of these bolts 59 will cause the parts 57 to bear firmly against the felt lined sides of the groove and thus hold the window frame securely in place.

The frame members 53, 54 and 55 are each provided with grooves 27 lined with felt 28 for the purpose of receiving the edges of the glass 29 in the same manner as described in the previous form. The top and bottom members 54 and 55 are also provided with split bearings 30 and 31 controlled by knurled nuts 35, these bearings being the same in structure and purpose as those shown in Figures 1 and 6. The flanges 36 and 37 are provided, as previously set forth, for the purpose of receiving the edges of the swinging window 34 when it is closed. The frame 60, in which the glass 34 is mounted, is shown in this instance as extending along the front edge of this glass and along its top and bottom edges to its rear edge. The top frame member 54 is provided with a bead or tongue 61 adapted to enter the groove 15 in the top of the window opening in the same manner as the tongues 22 on the members 20 and 21. The bottom frame member 55 is provided with a groove 62 which is adapted to receive the glass 12, this groove being also lined with felt. Skirt members 50 and 51 are provided if required for use in the same manner as previously set forth.

It is to be understood that the end frame member 17 may be provided with strips like the strips 56 if so desired.

It frequently occurs that the vehicle window casing outside the window grooves is smaller than inside. In such instances it is necessary to insert the auxiliary frame from the inside instead of from the outside. Where the form without hinge joints is used, it may of course be inserted from either side as found most convenient, but where the form illustrated in Figure 1 is used it can only be bent in one direction due to the nature of the hinges used. In order to provide a hinge that will allow bending in both directions as well as present a better appearance I have shown a slight modification as illustrated in Figures 12 and 13.

In these figures the hinges are formed as before by two overlapping disc-like parts 63 and 64 joined together by a bolt 65. This bolt however, is positioned centrally of the width of the frame members 20 and 21 and in line with the tongue 22. The discs 63 and 64 are made of smaller diameter so as to lie within the contour of the sides of the frame and the bolt 65 is provided with a countersunk head 66 grooved to receive a screw driver for adjustment purposes. These discs are serrated on their contacting faces at 67 in the same manner and for the same purpose as those previously described. It will readily be seen that this form of hinge will allow the frame to be bent in either direction as desired, and will at the same time present a less conspicuous and neater appearance.

In connection with the pivoted glass 34, it has been found that when the nuts 35 are loosened, thus leaving this glass free to swing, it will tend to swing back and forth at an average angle of about 45° when the vehicle is moving at the rate of 40 miles per hour or more. It does not close as might be expected with the wind pressure against the projecting large face of glass but will be kept in balance and will continue to operate with excellent results while swinging at will. It is therefore within the scope of this invention to allow this pivoted glass to swing at will if so desired.

In view of the above, it will be seen that there has been provided means for procuring draftless ventilation for any car or moving vehicle without alteration of the vehicle, which device may be readily and quickly attached or detached and which may be used to provide a perfectly weathertight closure when so desired. It will also be appreciated that there has been provided a means of the type set forth which will enable a driver to more readily signal his intention to surrounding traffic without unduly exposing himself or others to the weather conditions prevailing outside of the vehicle, and with the least possible trouble and delay to himself.

It will be appreciated furthermore that various modifications and changes may be made in the particular details and design of this invention without departing from the spirit of the same as expressed in the appended claims.

What I claim is:—

1. In a removable window for a vehicle body having a window opening therein and grooves in the sides of said opening, a frame having a fixed tongue at one side thereof adapted to engage the groove at one side of the opening, and a pair of removable tongue members adapted to engage the opposite faces of the frame adjacent the opposite side thereof and extend therefrom into the groove at the opposite side of the opening, means for detachably securing said removable tongues in position to engage said groove, a transparent member fixedly mounted in said frame adjacent one side thereof and a second transparent member pivotally mounted on a vertical axis adjacent the other side thereof.

2. In a removable window for a vehicle body having a window opening therein and grooves in the sides of said opening, a frame having a fixed tongue at one side thereof adapted to engage the groove at one side of the opening, and a pair of removable tongue members adapted to engage the opposite faces of the frame adjacent the opposite side thereof and extend therefrom into the groove at the opposite side of the opening, means for detachably securing said removable tongues in position to engage said groove, a transparent member fixedly mounted in said frame adjacent the rear side thereof, and a second transparent member pivotally mounted on a vertical axis adjacent the front side thereof, said vertical axis being spaced from the forward edge of said second transparent member but nearer the forward edge than the rear edge.

3. In a removable window for a vehicle body having a window opening therein and grooves in the sides and top of said opening adapted to receive a vertically slidable window, a frame having a fixed tongue along the top and one side thereof for engaging said groove at the top and one side of the opening, and a pair of removable tongue members adapted to engage the opposite faces of the frame along the other side thereof and extend therefrom into the groove at the opposite side of the opening, means for detachably securing said removable tongues in a position to engage said groove, a groove along the bottom of said frame adapted to receive the upper edge of said vertically slidable window, a transparent member fixedly mounted in said frame adjacent one side thereof, and a second transparent member pivotally mounted on a vertical axis adjacent the other side thereof.

4. In a removable window for a vehicle body having a window opening therein and grooves in the sides and top of said opening adapted to receive a vertically slidable window, a frame having a fixed tongue along the top and one side thereof for engaging said groove at the top and one side of the opening, and a pair of removable tongue members adapted to engage the opposite faces of the frame along the other side thereof and extend therefrom into the groove at the opposite side of the opening, means for detachably securing said removable tongues in a position to engage said groove, a groove along the bottom of said frame adapted to receive the upper edge of said vertically slidable window, a skirt member detachably secured to the lower portion of said frame and extending downwardly along the side of said vertically slidable window, a transparent member fixedly mounted in said frame adjacent one side thereof, and a second transparent member pivotally mounted on a vertical axis adjacent the other side thereof.

5. In a removable window for a vehicle body having a window opening therein and grooves in the sides of said opening, a frame having a fixed tongue adapted to engage the groove at one side of the opening and a removable tongue adapted to engage the groove at the opposite side of the opening, said removable tongue consisting of a pair of similar members, each having a part adapted to be disposed within the groove and a part adapted to be secured to one of the opposite faces of the side member of the frame, and means to clamp said members against the opposite faces of the side member of the frame to secure them thereto and to cause them to bear against the opposite sides of the groove.

JAMES D. PATTON.